US008195530B2

(12) United States Patent
Borowski

(10) Patent No.: US 8,195,530 B2
(45) Date of Patent: Jun. 5, 2012

(54) METHOD, SYSTEM, AND PROGRAM PRODUCT FOR CUSTOMIZING EDUCATIONAL MATERIALS

(75) Inventor: Zbigniew J. Borowski, Marietta, GA (US)

(73) Assignee: International Business Machines Corporation, Armonk, NY (US)

( * ) Notice: Subject to any disclaimer, the term of this patent is extended or adjusted under 35 U.S.C. 154(b) by 1018 days.

(21) Appl. No.: 11/749,882

(22) Filed: May 17, 2007

(65) Prior Publication Data

US 2008/0288359 A1 Nov. 20, 2008

(51) Int. Cl.
*G06Q 30/00* (2006.01)
(52) U.S. Cl. ............... 705/27.1; 705/26.1; 705/7.11
(58) Field of Classification Search ............ 705/26, 705/27, 7
See application file for complete search history.

(56) References Cited

U.S. PATENT DOCUMENTS

| 6,053,737 | A  | 4/2000  | Babbitt et al.       |
| 6,064,856 | A  | 5/2000  | Lee et al.           |
| 6,270,351 | B1 | 8/2001  | Roper                |
| 6,658,427 | B2 | 12/2003 | Kogut-O'Connell et al. |
| 6,807,535 | B2 | 10/2004 | Goodkovsky           |
| 6,845,229 | B2 | 1/2005  | Notomi               |
| 6,947,914 | B2 | 9/2005  | Bertrand et al.      |
| 6,965,752 | B2 | 11/2005 | Allen et al.         |
| 2002/0188583 | A1* | 12/2002 | Rukavina et al. ............ 706/45 |
| 2004/0009462 | A1* | 1/2004  | McElwrath .................. 434/350 |
| 2005/0158697 | A1* | 7/2005  | Nelson et al. ............... 434/350 |

OTHER PUBLICATIONS

Irlbeck et al.: "The Phoenix Rising: Emergent models of instructional design," Distance Education, Aug. 2006, v27i2pg171; Proquest #1228071581, 13pgs.*
Chalk Media: "Chalk Media releases robust Learning Content Management System (LCMS) software platform: Chalkboard™ LCMS v2.5," Canada NewsWire, Apr. 21, 2005; Proquest #824817941, 3pgs.*
Kutay et al.: "Designing Agents for Feedback Using the Documents Produced in Learning," 2005, V4i1pg21; Proquest #835229251, 15pgs.*
Nkambou, Roger, "Managing Inference Process in Student Modeling for Intelligent Tutoring System," Nov. 1999, 5 pages, IEEE International Conference on Tools with Artificial Intelligence.
C.D. Robinson et al., "Bridging the Virtual and the Physical: The InterSim as a Collaborative Support Interface," May 1997, pp. 556-558, Proceedings from the AI-ED 1997 World Conference on Artificial Intelligence in Education.

* cited by examiner

*Primary Examiner* — Robert M. Pond
(74) *Attorney, Agent, or Firm* — Hoffman Warnick LLC; Anna L. Linne

(57) ABSTRACT

The invention provides a method, system, and program product for preparing customized educational materials. The invention may include, for example, receiving input from a user regarding the user's preferences for educational materials, retrieving core educational materials from a repository, accepting dynamic educational materials, and assembling the customized educational materials using the core educational materials, the dynamic educational materials, and the user's preferences. The invention may further include scheduling the delivery of the customized educational materials to a user.

16 Claims, 3 Drawing Sheets

METHOD, SYSTEM, AND PROGRAM PRODUCT FOR CUSTOMIZING EDUCATIONAL MATERIALS

FIELD OF THE INVENTION

The invention relates generally to the provision of educational materials, and more particularly, to the assembly and delivery of educational materials customized to suit a user's need, request, and/or preference.

BACKGROUND OF THE INVENTION

Educational materials are used in many environments other than the formal educational environments one may first think of. For example, businesses may use educational materials to enhance the skills of their employees or as an aid to employees attempting to solve a particular problem.

Regardless of the situation or context in which educational materials are provided to a user, it is often the case that the materials are not as well suited to a user's needs as they could be. This is often due to the necessity of generalizing or averaging the contents of the materials so that they may be used by many individuals having varying needs, skills, levels of proficiency with the subject matter, etc. For example, two individuals within the same organization may request educational materials on the same subject, such as "aeronautics." If the first individual is an engineer with a background in aeronautics and the second individual is a research assistant with no technical background, it is quite likely that the two are seeking different materials. The engineer is likely looking for highly detailed and technical materials and is not interested in a primer on aeronautics. The research assistant, on the other hand, is likely looking for a primer on aeronautics and is not interested in detailed or technical materials. Using known, systems for the delivery of educational materials, both the engineer and the research assistant would be provided the same materials, leaving it to each to decide which material is relevant for their needs. The result is that many users are provided with educational materials that, to greater or lesser extents, do not fill their needs. Clearly, this is a less-than-efficient method of providing educational materials.

Accordingly, there exists a need in the art to overcome the deficiencies and limitations described hereinabove.

SUMMARY OF THE INVENTION

The invention provides a method, system, and program product for preparing customized educational materials. In one embodiment, a method according to the invention includes receiving input from a user regarding the user's preferences for educational materials; retrieving core educational materials from a repository; accepting dynamic educational materials; and assembling the customized educational materials using the core educational materials, the dynamic educational materials, and the user's preferences.

A first aspect of the invention provides a method of preparing customized educational materials, the method comprising: receiving input from a user regarding the user's preferences for educational materials; retrieving core educational materials from a repository; and assembling customized educational materials using the core educational materials and the user's preferences.

A second aspect of the invention provides a system for preparing customized educational materials, the system comprising: a system for receiving input from a user regarding the user's preferences for educational materials; a system for retrieving core educational materials from a repository; and a system for assembling customized educational materials using the core educational materials and the user's preferences.

A third aspect of the invention provides a program product stored on a computer-readable medium, which when executed prepares customized educational materials, the program product comprising: program code for receiving input from a user regarding the user's preferences for educational materials; program code for retrieving core educational materials from a repository; and program code for assembling customized educational materials using the core educational materials and the user's preferences.

A fourth aspect of the invention provides a method for deploying an application for preparing customized educational materials, comprising: providing a computer infrastructure being operable to: receive input from a user regarding the user's preferences for educational materials; retrieve core educational materials from a repository; and assemble customized educational materials using the core educational materials and the user's preferences.

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, the invention provides a method, system, and program product for the assembly of educational materials customized to suit a user's need, request, and/or preference. As used herein, "educational materials" is a broad category of materials suitable for use in developing skills, increasing knowledge or abilities, or solving problems. Such materials may be used in conjunction with a formal educational or vocational program or separate from such a program.

Figure 1:
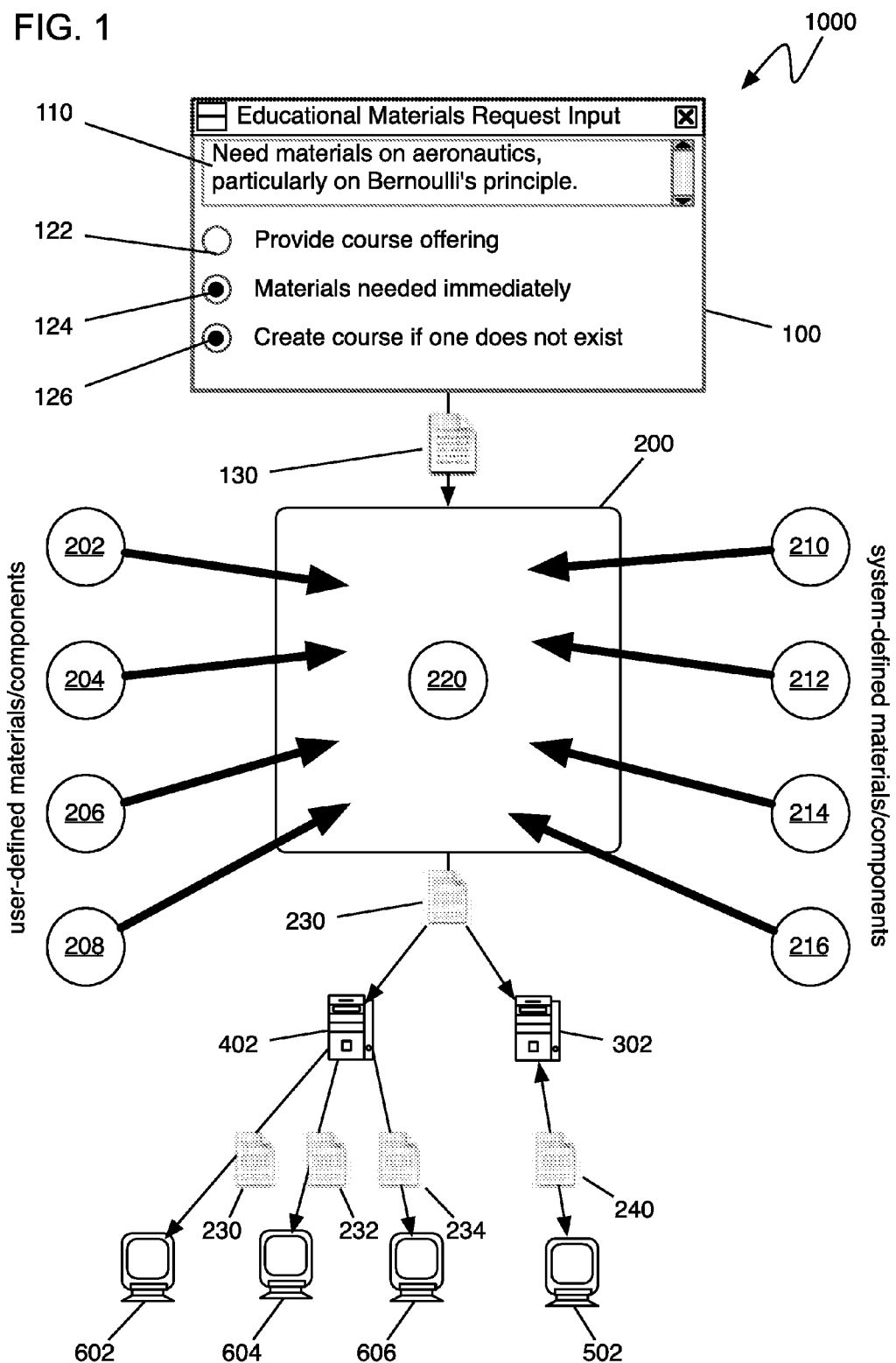
FIG. 1 shows a block and flow diagram of an illustrative system and method according to an embodiment of the invention.

Referring now to the figures, FIG. 1 shows an illustrative system 1000 and method for assembling customized educational materials according to an embodiment of the invention. A graphical user interface (GUI) 100 running on a user's computing device 502 is used to collect information regarding the user's need for educational materials. As shown, GUI 100 includes a text box 110, into which the user may enter information regarding his or her request for educational materials, and radio buttons 122, 124, 126 for the user to specify his or her requested method and/or timeframe for delivery of the requested materials or request that a course be created if one matching the user's request does not yet exist. Any number of other user preferences may similarly be entered. For example, a user may specify a period during which the requested educational materials are needed or will be used (the life cycle of the materials).

GUI 100 is merely illustrative of the types of user interfaces that may be employed in collecting information from a user. One skilled in the art will appreciate many other formats and devices for collecting such information. For example, rather than being provided as a GUI, the present invention may include computer code for logging a user's search engine queries, such that the user may be provided educational materials related to the subject he or she most often queries using a search engine.

Once collected, data 130 relating to the educational materials requested and, optionally, any user preferences specified using GUI 100, are forwarded to a materials repository 200. Materials repository 200 may contain core educational materials 220 used in the assembly of all customized educational materials. For example, in the case shown in FIG. 1, where a user is requesting materials on aeronautics, core educational materials 220 may include individual chapters of a treatise on aeronautics. Depending on a user's needs and background, an appropriate subset of such chapters may be included in the customized educational materials ultimately delivered to the user. The contents of core educational materials may be altered only at the system level by one having sufficient privileges to do so.

Materials repository 200 may also include dynamic educational materials 202-216, the contents of which may be changed other than at the system level. As shown in the example in FIG. 1, dynamic educational materials 202-216 comprise two groups: user-defined materials/components 202-208 and system-defined materials/components 210-216.

User-defined materials/components 202-208 may include, for example, a user's preference for the format of delivered educational materials (e.g., language, style (visual, audio, text, graphics), etc.), a user profile retrieved from an external database, a link to an external source (e.g., a website) showing the type of educational materials the user is requesting, information regarding the schedule and/or method by which the customized educational materials are to be delivered, etc.

System-defined materials/components 210-216 may include, for example, information retrieved from trusted sources (e.g., authoritative websites, experts in the field), common elements (i.e., elements common to all or many customized educational materials, such as generic graphics or hyperlinks to company websites or email addresses), billing information, if applicable, etc. Like core educational materials 220, system-defined materials/components 210-216 are set at the system level. Unlike core educational materials 200, and like user-defined materials/components 202-208, the contents of system-defined materials/components 210-216 may change without the interaction of a system administrator. For example, once the system administrator sets a particular website as a trusted source, its contents may be incorporated into customized educational materials, even though the system administrator does not control those contents.

Customized educational materials 230 are assembled from core educational materials 220 and dynamic educational materials 202-216. While not shown, customized educational materials 230 may comprise smaller components, each assembled from core educational materials 220 and dynamic educational materials 202-216. Thus, different versions of customized educational materials 230 may be composed of different smaller components, referred to here as adaptive learning modules (ALMs).

Once assembled, customized educational materials 230 (whether existing in one or more versions) are transferred to one or both of a dynamic "on demand" database 302 and a static "course" database. Dynamic database 302 permits a user (the user that originally requested the educational materials and/or another user) to further modify the customized educational materials 240 after they are delivered from the dynamic database 302 to the user's computing device 502. These modifications may then be transmitted back to the dynamic database 302 and the customized educational materials 240 may be further customized according to the modifications. Thus, the customization of educational materials 240 may continue in a collaborative fashion among a number of users, with the collaborative customization being reflected in the ongoing customization of the educational materials.

Static database 402 does not permit users to further modify the customized educational materials after they are delivered to the users' computing devices 602-604. However, different versions 230-232 may be delivered to different users, if such different versions have previously been assembled and stored on the static database 402.

Figure 2:
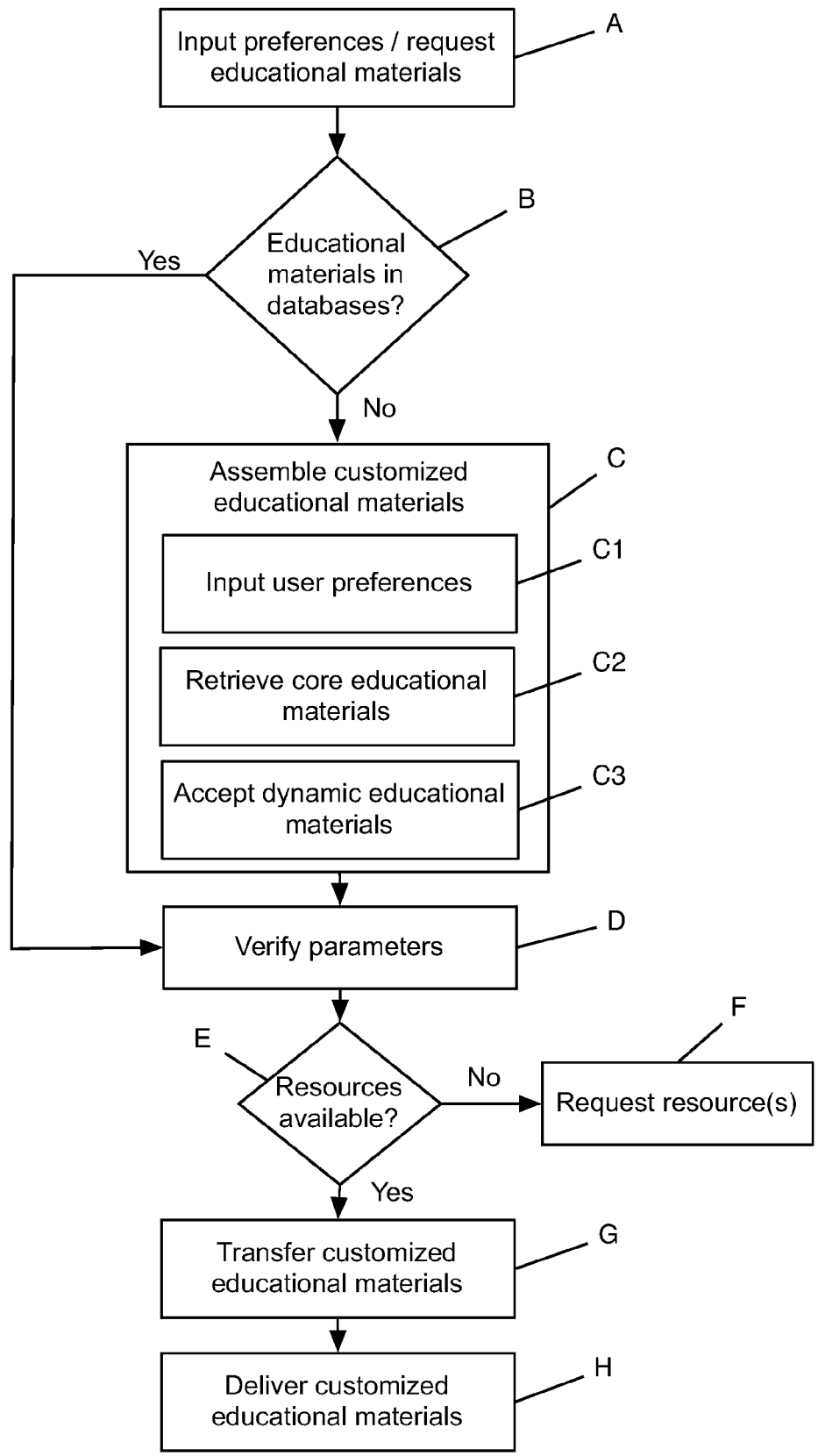
FIG. 2 shows a flow diagram of an illustrative method according to an alternative embodiment of the invention.

Referring now to FIG. 2, a flow diagram of an illustrative method according to the invention is shown. At A, a user inputs his or her preferences and a request for educational materials. At B, a database (e.g., static database 402 in FIG. 1) is queried to determine whether the educational materials requested at A have already been assembled in a version suitable for the user. If so (i.e., Yes at B), the parameters of the customized educational materials are verified at D. Such parameters may include, for example, the resources necessary to make use of the materials, the recency of the materials' assembly, the viability of delivery of the materials by the user's preferred delivery method, etc.

If not (i.e., No at B), customized educational materials are assembled at C. As noted above with respect to FIG. 1, assembling customized educational materials may include, for example, inputting user preferences at C1, retrieving core educational materials from a materials repository at C2, and accepting dynamic educational materials at C3. Once assembled, the parameters of the customized educational materials assembled at C are verified at D.

At E, it is determined whether the resources necessary to deliver the customized educational materials are available. If not (i.e., No at E), such resources may be requested at F. If the resources are available (i.e., Yes at E), the customized educational materials are transferred (e.g., to the dynamic database 302 and/or static database 402 in FIG. 1) at G and then delivered to a user's computing device at H.

It should be noted that additional steps may be included in other embodiments of the invention, the embodiment shown in FIG. 2 merely being illustrative. For example, a user may be required to enroll in a course or other educational or vocational program before customized educational materials are delivered to the user at H. In other embodiments, a user may be billed or otherwise charged for the delivery of customized educational materials.

Delivery of customized educational materials may be scheduled according to a user's preferences. For example, each member of a group of users may specify his or her preferred time for delivery of the customized educational materials. Members may then be grouped into classes according to preferred delivery times.

Figure 3:
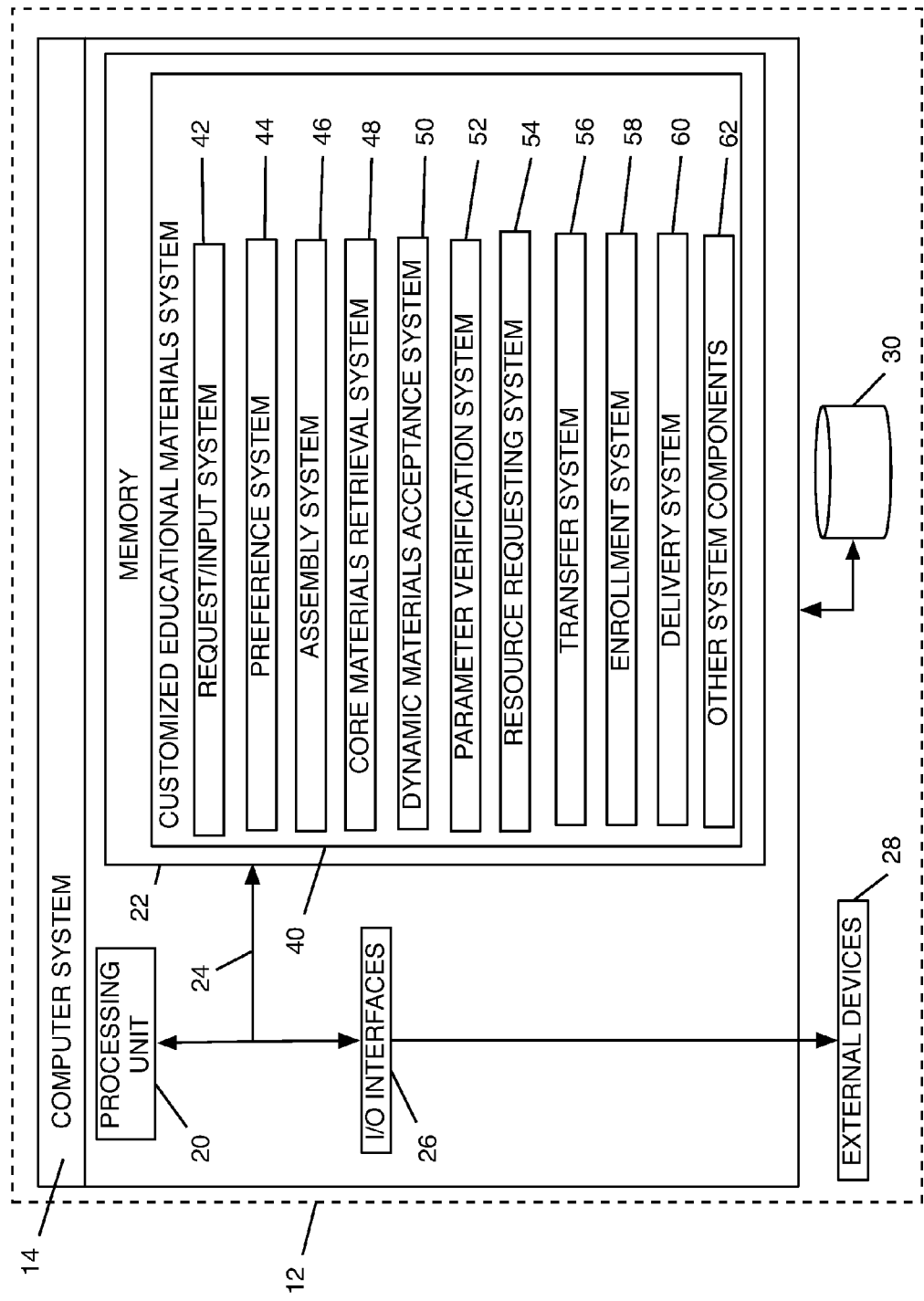
FIG. 3 shows a block diagram of an illustrative system according to an embodiment of the invention.

FIG. 3 shows an illustrative system 10 for preparing customized educational materials according to an embodiment of the invention. To this extent, system 10 includes a computer infrastructure 12 that can perform the various process steps described herein for preparing customized educational materials. In particular, computer infrastructure 12 is shown including a computer system 14 that comprises a customized educational materials system 40, which enables computer system 14 to prepare customized educational materials by performing the process steps of the invention.

Computer system 14 is shown including a processing unit 20, a memory 22, an input/output (I/O) interface 26, and a bus 24. Further, computer system 14 is shown in communication with external devices 28 and a storage system 30. As is known in the art, in general, processing unit 20 executes computer program code, such as customized educational materials system 40, that is stored in memory 22 and/or storage system 30. While executing computer program code, processing unit 20 can read and/or write data from/to memory 22, storage system 30, and/or I/O interface 26. Bus 24 provides a communication link between each of the components in computer system 14. External devices 28 can comprise any device that enables a user (not shown) to interact with computer system 14 or any device that enables computer system 14 to communicate with one or more other computer systems.

In any event, computer system 14 can comprise any general purpose computing article of manufacture capable of executing computer program code installed by a user (e.g., a personal computer, server, handheld device, etc.). However, it is understood that computer system 14 and customized educational materials system 40 are only representative of various possible computer systems that may perform the various process steps of the invention. To this extent, in other embodiments, computer system 14 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computer infrastructure 12 is only illustrative of various types of computer infrastructures for implementing the invention. For example, in one embodiment, computer infrastructure 12 comprises two or more computer systems (e.g., a server cluster) that communicate over any type of wired and/or wireless communications link, such as a network, a shared memory, or the like, to perform the various process steps of the invention. When the communications link comprises a network, the network can comprise any combination of one or more types of networks (e.g., the Internet, a wide area network, a local area network, a virtual private network, etc.). Regardless, communications between the computer systems may utilize any combination of various types of transmission techniques.

As previously mentioned, customized educational materials system 40 enables computer system 14 to prepare customized educational materials. To this extent, customized educational materials system 40 is shown including a request/input system 42, a preference system 44, an assembly system 46, a core materials retrieval system 48, a dynamic materials acceptance system 50, a parameter verification system 52, a resource requesting system 54, a transfer system 56, an enrollment system 58, and a delivery system 60. Operation of each of these systems is discussed above. Customized educational materials system 40 may further include other system components 62 to provide additional or improved functionality to customized educational materials system 40. It is understood that some of the various systems shown in FIG. 3 can be implemented independently, combined, and/or stored in memory for one or more separate computer systems 14 that communicate over a network. Further, it is understood that some of the systems and/or functionality may not be implemented, or additional systems and/or functionality may be included as part of system 10.

While shown and described herein as a method and system for preparing customized educational materials, it is understood that the invention further provides various alternative embodiments. For example, in one embodiment, the invention provides a computer-readable medium that includes computer program code to enable a computer infrastructure to prepare customized educational materials. To this extent, the computer-readable medium includes program code, such as customized educational materials system 40, that implements each of the various process steps of the invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computer system, such as memory 22 and/or storage system 30 (e.g., a fixed disk, a read-only memory, a random access memory, a cache memory, etc.), and/or as a data signal traveling over a network (e.g., during a wired/wireless electronic distribution of the program code).

In another embodiment, the invention provides a business method that performs the process steps of the invention on a subscription, advertising, and/or fee basis. That is, a service provider could offer to prepare customized educational materials as described above. In this case, the service provider can create, maintain, support, etc., a computer infrastructure, such as computer infrastructure 12, that performs the process steps of the invention for one or more customers. In return, the service provider can receive payment from the customer(s) under a subscription and/or fee agreement and/or the service provider can receive payment from the sale of advertising space to one or more third parties.

In still another embodiment, the invention provides a method of generating a system for preparing customized educational materials. In this case, a computer infrastructure, such as computer infrastructure 12, can be obtained (e.g., created, maintained, having made available to, etc.) and one or more systems for performing the process steps of the invention can be obtained (e.g., created, purchased, used, modified, etc.) and deployed to the computer infrastructure. To this extent, the deployment of each system can comprise one or more of (1) installing program code on a computer system, such as computer system 14, from a computer-readable medium; (2) adding one or more computer systems to the computer infrastructure; and (3) incorporating and/or modifying one or more existing systems of the computer infrastructure, to enable the computer infrastructure to perform the process steps of the invention.

As used herein, it is understood that the terms "program code" and "computer program code" are synonymous and mean any expression, in any language, code or notation, of a set of instructions intended to cause a computer system having an information processing capability to perform a particular function either directly or after either or both of the following: (a) conversion to another language, code or notation; and (b) reproduction in a different material form. To this extent, program code can be embodied as one or more types of program products, such as an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method of preparing customized educational materials, the method comprising:
    receiving from a user a request for educational materials;
    receiving input from the user regarding a preferred format for the educational materials;
    receiving input from the user regarding a time period during which the educational materials are needed;
    retrieving core educational materials from a repository;
    assembling customized educational materials using the core educational materials and according to the user's preferred format;
    transferring the customized educational materials to a dynamic database from which the customized educational materials are delivered to the user during the time period; and
    permitting access by the user, an additional user, or both, and further customizing the customized educational material within the dynamic database by the user, and the additional user, or both.

2. The method of claim 1, further comprising:
    accepting dynamic educational materials,
    wherein the assembling customized educational materials further includes using the dynamic educational materials.

3. The method of claim 2, wherein the dynamic educational materials are selected from a group consisting of: website content, content from a predefined source, content provided by a user, and a database of educational materials.

4. The method of claim 1, further comprising:
    importing information related to the user from a database.

5. The method of claim 1, wherein the preferred format includes at least one format selected from a group consisting of: a visual format, an audio format, a text format, and a graphical format.

6. A system for preparing customized educational materials comprising:
    at least one computing device configured to:
        receive from a user a request for educational materials;
        receive input from the user regarding a preferred format for the educational materials;
        receive input from the user regarding a time period during which the educational materials are needed;
        retrieve core educational materials from a repository;
        assemble customized educational materials using the core educational materials and according to the user's preferred format;
        transfer the customized educational materials to a dynamic database from which the customized educational materials are delivered to the user during the time period; and
        permit access by the user, an additional user, or both, and further customize the customized educational material within the dynamic database by the user, and the additional user, or both.

7. The system of claim 6, wherein the at least one computing device is further configured to: accept dynamic educational materials, wherein the assemble customized educational materials further includes using the dynamic educational materials.

8. The system of claim 7, wherein the dynamic educational materials are selected from a group consisting of: website content, content from a predefined source, content provided by a user, and a database of educational materials.

9. The system of claim 6, wherein the at least one computing device is further configured to: import information related to the user from a database.

10. The system of claim 6, wherein the preferred format includes at least one format selected from a group consisting of: a visual format, an audio format, a text format, and a graphical format.

11. A program product stored on a computer-readable storage medium, which when executed prepares customized educational materials by carrying out a method comprising:
    receiving from a user a request for educational materials;
    receiving input from the user regarding a preferred format for the educational materials;
    receiving input from the user regarding a time period during which the educational materials are needed;
    retrieving core educational materials from a repository;
    assembling customized educational materials using the core educational materials and according to the user's preferred format;
    transferring the customized educational materials to a dynamic database from which the customized educational materials are delivered to the user during the time period; and permitting access by the user,
    an additional user, or both, and further customizing the customized educational material within the dynamic database by the user, and the additional user, or both.

12. The program product of claim 11, wherein the method further comprises:
    accepting dynamic educational materials; and
    assembling the customized educational materials using the dynamic educational materials.

13. The program product of claim 12, wherein the dynamic educational materials are selected from a group consisting of: website content, content from a predefined source, content provided by the user, and a database of educational materials.

14. The program product of claim 11, wherein the preferred format includes at least one format selected from a group consisting of: a visual format, an audio format, a text format, and a graphical format.

15. A method for deploying an application for preparing customized educational materials, comprising:
    configuring at least one computing device to:
        receive from a user a request for educational materials;
        receive input from the user regarding a preferred format for the educational materials;
        receive input from the user regarding a time period during which the educational materials are needed;
        retrieve core educational materials from a repository;
        assemble customized educational materials using the core educational materials and according to the user's preferred format;
        transfer the customized educational materials to a dynamic database from which the customized educational materials are delivered to the user during the time period; and
        permit access by the user, an additional user, or both, and further customize the customized educational material within the dynamic database by the user, and the additional user, or both.

16. The method of claim 15, wherein the preferred format includes at least one format selected from a group consisting of: a visual format, an audio format, a text format, and a graphical format.

* * * * *